US007374069B2

(12) United States Patent
Amron

(10) Patent No.: US 7,374,069 B2
(45) Date of Patent: May 20, 2008

(54) EDIBLE FOOD PRODUCT DISPENSING SYSTEM AND METHODS OF USING THE SAME

(75) Inventor: Alan B. Amron, Woodbury, NY (US)

(73) Assignee: Tropical Ventures, LLC, Hempstead, NY (US)

( * ) Notice: Subject to any disclaimer, the term of this patent is extended or adjusted under 35 U.S.C. 154(b) by 34 days.

(21) Appl. No.: 11/230,143

(22) Filed: Sep. 19, 2005

(65) Prior Publication Data

US 2007/0063069 A1 Mar. 22, 2007

(51) Int. Cl.
*G01F 11/20* (2006.01)

(52) U.S. Cl. ........................ 222/410; 222/215; 222/537

(58) Field of Classification Search ................ 222/410, 222/215, 537, 237
See application file for complete search history.

(56) References Cited

U.S. PATENT DOCUMENTS

| | | | | |
|---|---|---|---|---|
| 1,941,786 | A * | 1/1934 | Albert et al. | 222/410 |
| 2,830,739 | A * | 4/1958 | Moye | 222/410 |
| 2,998,166 | A * | 8/1961 | Klawiter | 222/410 |
| 3,399,638 | A * | 9/1968 | Bishop et al. | 222/204 |
| 4,397,879 | A * | 8/1983 | Wilson | 222/215 |
| 4,615,488 | A | 10/1986 | Sands | |
| 4,821,961 | A | 4/1989 | Shook | |
| 4,842,200 | A | 6/1989 | Hermansson | |
| 5,244,153 | A | 9/1993 | Kuhn et al. | |
| 5,392,968 | A * | 2/1995 | Dark | 222/530 |
| 5,427,320 | A | 6/1995 | Mak et al. | |
| 5,667,138 | A * | 9/1997 | Crampton | 239/225.1 |
| 6,250,506 | B1 * | 6/2001 | Geiger et al. | 222/413 |
| 6,594,843 | B1 | 7/2003 | Wilkins | |
| 6,935,531 | B1 | 8/2005 | Clayton | |
| 6,959,838 | B2 | 11/2005 | Eddins et al. | |
| 7,032,837 | B2 | 4/2006 | Eddins et al. | |
| 2004/0164090 | A1 | 8/2004 | Eddins et al. | |
| 2005/0173559 | A1 | 8/2005 | Eddins et al. | |

* cited by examiner

*Primary Examiner*—Philippe Derakshani
(74) *Attorney, Agent, or Firm*—Cohen Pontani Lieberman & Pavane

(57) ABSTRACT

A dispensing system for dispensing a viscous, flowable food product such, for example, as a condiment, comprises an axially extending container that defines an opening and an interior chamber for receiving and storing the food product. A discharge assembly is coupled to the container, the discharge assembly being dimensioned and arranged to spin, relative to the container, as it receives the viscous food product from the interior chamber. The spinning motion of the discharge assembly, accompanied by a linear movement of the container itself relative to a target food item, allows the user to cleanly and evenly distribute the flowable food material onto the target item in an attractive, curvilinear deposit pattern. Optionally, the discharge assembly may be configured with a pivoting nozzle that can be moved from a position for obtaining a helical (curvilinear) deposit pattern to a position for obtaining a rectilinear deposit pattern.

16 Claims, 2 Drawing Sheets

EDIBLE FOOD PRODUCT DISPENSING SYSTEM AND METHODS OF USING THE SAME

FIELD OF THE INVENTION

The present invention relates generally to the dispensing of viscous food products and, more particularly, to the use of a rotatable discharge assistant operative to dispense, from a container such as a squeeze bottle, a viscous food product along an arcuate path.

BACKGROUND OF THE INVENTION

Squeeze bottles for storing and dispensing viscous, flowable food products such as syrups, jellies, and condiments are well known. Generally, such bottles include a container made of a plastic or other easily deformable material and define an interior cavity for receiving and storing the food product. The container may further define a neck portion disposed at one end of the container that is attached to a dispensing closure assembly. A typical dispensing closure assembly includes a cap that is threadedly connected to the neck of the container at one end, and has a single outlet tip that faces outwardly from the container at the other end. During use, the container is inverted and squeezed to dispense the viscous food product from the tip orifice onto a target food item as a directed stream.

Conventional dispensing closures define an orifice having a circular cross section sized to provide the user with flexibility to apply a desired amount of product to the target food item. A softer squeezing of the container will yield a lower mass flow rate out of the tip. Accordingly, in order to accommodate those who wish to apply only a small amount of condiment to the food product, the tips are generally designed with a small cross section. Those who desire an additional amount of condiment can squeeze harder and, typically, make several passes at the food product. This can be a time consuming and often messy procedure. Further, one squeeze may not provide a sufficient amount of pressure to dispense condiment over the length of time necessary to conduct several passes, thereby necessitating multiple squeezes and a resulting non-uniform volume of dispensed condiment across the food product.

There is a need for a discharge assistant usable in combination with a conventional container that enables one to apply a sufficient and consistent amount of an edible viscous food product, such as a condiment, to a target food item.

SUMMARY OF THE INVENTION

The aforementioned need is addressed, and an advance is made in the art, by a dispensing system configured to dispense a viscous, flowable food product such, for example, as a condiment. The dispensing system comprises an axially extending container that defines an opening and an interior chamber for receiving and storing the food product. A discharge assembly is coupled to the container, the discharge assembly being dimensioned and arranged to spin, relative to the container, as it receives the viscous food product from the interior chamber. The spinning motion of the discharge assembly, accompanied by a linear movement of the container itself relative to a target food item, allows the user to cleanly and evenly distribute the flowable food material onto the target item in an attractive, helical (or more broadly speaking, curvilinear) deposit pattern.

An illustrative embodiment of the discharge assembly includes a first section defining an interior cavity, the first section also defining both an inlet opening dimensioned and arranged to establish fluid communication between the interior cavity and the interior chamber, and an outlet opening dimensioned and arranged to allow food product flowing under pressure to exit the interior cavity as a stream as said first section spins.

A typical configuration for a dispensing system constructed in accordance with the present invention employs a squeeze bottle as the container, wherein squeezing the deformable sidewall of the container causes the food material to flow from the interior chamber into the interior cavity of the discharge assembly. In accordance with an especially preferred embodiment of the invention, the same squeezing force which causes the edible material to flow is also used to produce rotary motion of the discharge assembly. To this end, the discharge assembly may include a plurality of vanes disposed within the interior cavity, the vanes being dimensioned and arranged to convert energy imparted by flowing food product impinging thereon into forces driving rotary motion of the discharge assembly.

The discharge assembly may be further configured with a pivotably movable nozzle member having a distal section defining a nozzle orifice and having a substantially spherical proximal section retained in fluid communication with the outlet opening, whereby a user can control at least one of a diameter and a pitch of said helical deposit pattern by selecting an appropriate angular position of the nozzle member. The location of the nozzle member may be offset relative to a central axis of rotation of the discharge assembly. Alternatively, the nozzle member may be positioned coaxially with the central axis of rotation, the latter configuration having the advantage of permitting the user to select between an angled orientation suited for producing helical deposit patterns on a target food item and a non-pivoted orientation which enables the consumer to direct the flow along a rectilinear deposit path.

BRIEF DESCRIPTION OF THE DRAWINGS

The details of the present invention, both as to its construction and operation can best be understood with reference to the accompanying drawings, in which like numerals refer to like parts, and in which.

DETAILED DESCRIPTION OF THE INVENTION

Figure 1:
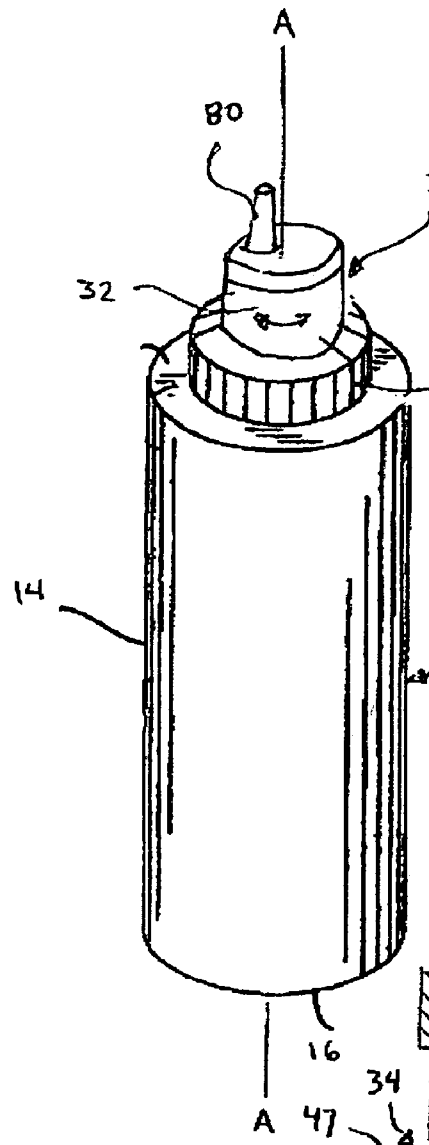
FIG. 1 is a side elevation view depicting a viscous edible food material dispensing system in accordance with an illustrative squeeze bottle embodiment of the present invention, the system being equipped with a discharge assembly adapted to rotate automatically, as the edible material is discharged, to produce a helical deposit pattern.

The accompanying Figures and this description depict and describe embodiments of a discharge assistant adapted for use with a conventional container in accordance with the present invention, and features and components thereof. The present invention also encompasses a method of making and using embodiments of the discharge assistant. As used herein, the phrases or terms "discharge assistant," "dispensing closure assembly," "discharge assembly" and the like are intended to encompass a structure or structures configured to dispense an edible, viscous material such, for example, as a condiment like ketchup or mustard, onto a target food item in a manner other than as a continuous rectilinear ("straight-line") deposit pattern or as a series of brief rectilinear pulses. It is important to note, however, that viscous food product dispensing systems in accordance with the present invention can, if an optional mode of operation is desired, be configured to dispense product in a continuous or broken rectilinear deposit pattern if the consumer so selects. It should also be noted that any references herein to front and back, right and left, top and bottom and upper and lower are intended for convenience of description, not to limit the present invention or its components to any one positional or spacial orientation.

With regard to fastening, mounting, attaching or connecting components of the present invention to form the dispensing system as a whole, unless specifically described otherwise, such are intended to encompass conventional fasteners such as threaded connectors, snap rings, detent arrangements, pins and the like. Components may also be connected by adhesives, glues, welding, ultrasonic welding, and friction fitting or deformation, if appropriate, and appropriate liquid and/or airtight seals or sealing devices may be used. Electronic portions of the device may use conventional, commercially available electronic components, connectors and devices such as suitable wiring, connectors, printed circuit boards, microchips, pressure sensors, liquid level sensors, inputs, outputs and the like. Unless specifically otherwise disclosed or taught, materials for making components of the present invention may be selected from appropriate materials such as metal, metallic alloys, natural and man-made fibers, vinyls, plastics and the like, and appropriate manufacturing or production methods including casting, pressing, extruding, molding and machining may be used.

With regard to the manner in which viscous food material is urged to flow toward a discharge opening, it should be borne in mind that although the various embodiments described herein incorporate a squeeze bottle configuration in which material flows when a deformable sidewall of a flexible container is squeezed, the invention is not limited to such configurations. For example, rigid container in conjunction with a motorized or manual pump mechanism may be used. It suffices to say that the manner in which forces for causing the edible product to be ejected from the container is of no particular consequence to the inventor herein except insofar as manufacturing cost, simplicity and ease of use are always considerations to be borne in mind.

Figure 2:
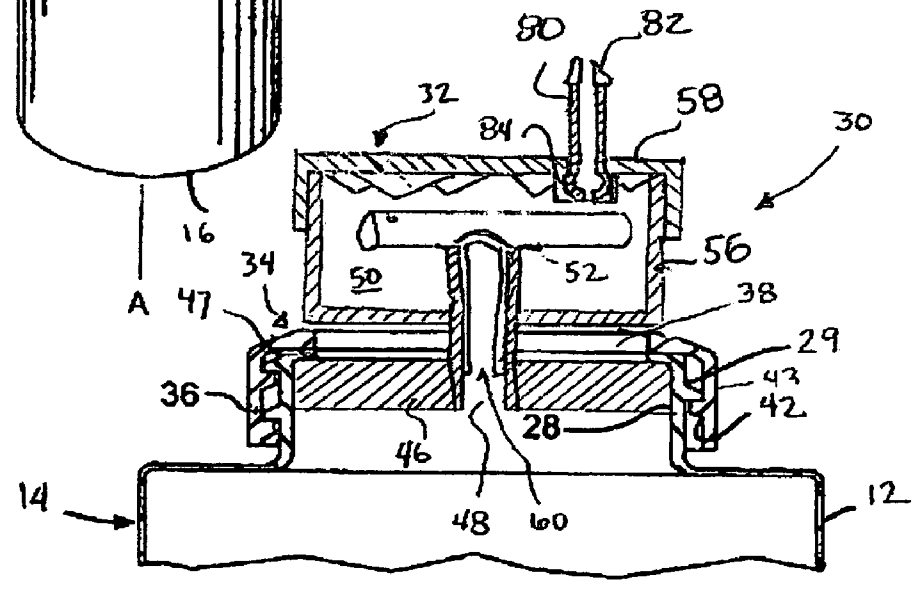
FIG. 2 is a partial, side elevation view, in cross section, depicting the internal construction of an illustrative embodiment of a rotatable discharge assembly.

Turning now to FIG. 1, an illustrative embodiment of a viscous food dispensing system 10 in accordance with the present invention is depicted. The depicted squeeze bottle embodiment includes an axially extending container 12 having an elongated cylindrical side wall 14 extending axially along axis of extension A—A. A base 16 is disposed at the one axial end of the side wall 14 that seals the bottom of the container 12. A neck 28 (FIG. 2) is integrally connected to the axially upper end of the container 12, and is defined by a reduced diameter compared to that of side wall 14. Neck 28 includes a threaded outer surface 29 (FIG. 2). An internal void or chamber 22 is thus collectively defined by side wall 14 and base 16 for housing a volume of flowable liquid material. Examples of such flowable liquid material include condiments such as ketchup, mustard, mayonnaise, relish, or the like that may be poured into the neck 28 of container 12.

Container 12 can be made of a transparent or translucent plastic such as polypropylene or polyethylene to enable the user to gauge the amount and type of material in the container to determine when the container 12 is to be refilled (or discarded, as the case may be). Alternatively, the plastic may be color coded to identify the type of material. The plastic is also preferably resilient so as to enable the user to squeeze the container 12 and thus provide an internal pressure suitable to force a directed stream of material out of the container and towards a desired food product. As noted previously, it should be understood that other means for urging the food material toward a discharge opening may be employed.

With reference to both FIGS. 1 and 2, it will be seen that a discharge assembly 30 is removably connected to the neck 28, and includes a first section indicated generally at 32, and a second section indicated generally at 34. Second section 34 is adapted for fixed connection to container 12 and, to that end, includes a cylindrical flange 36 that extends axially inwardly from the radially outer edge of a substantially radially extending plate 38. The inner surface 42 of flange 36 is threaded and is configured to be removably connected to the container 12 by the threaded outer surface of neck 28 once the container 12 has been filled with the desired material. The outer surface 43 of flange 36 is preferably textured to enable a user to easily grip discharge assembly 30 for attaching the same to, and removing the same from, container 12. As best seen in FIG. 2, second section further includes a first conduit assembly indicated generally at reference number 46. The axially upper surface 47 of first conduit assembly 46 is seated on the axially lower surface of plate 38 and defines a central flow conduit 48 dimensioned and arranged to receive and transport the flowable liquid material into the first section 32, as will now be described in greater detail.

Unlike second section 34, which is adapted to be secured to container 12, first section 32 of discharge assembly 30 is dimensioned and arranged to rotate relative to container 12. Automatic rotation of discharge assembly section 32 to produce a helical deposit effect can be achieved in a variety of ways. By way of illustrative example, an illustrative discharge assembly constructed in accordance with motorized embodiments of the invention may include a motorized drive assembly (not shown) responsive to depression of a trigger or, alternatively, to actuation of an on/off selector switch, and drivingly engageable with appropriate gearing coupled to first section 32

Figure 3A:
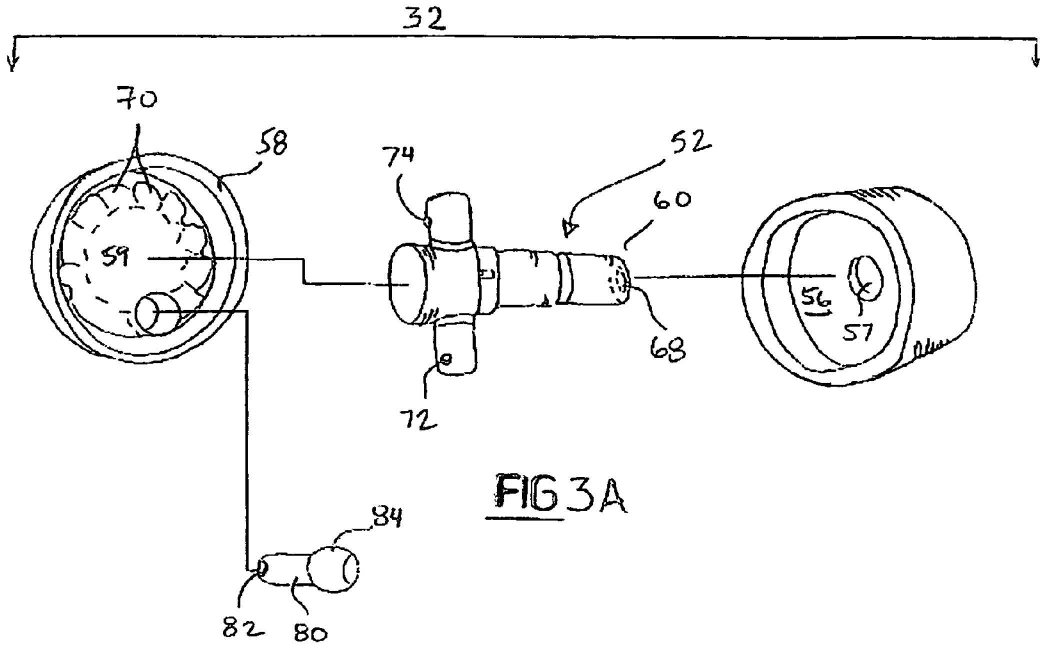
FIG. 3A is broken apart, perspective view depicting the internal construction of an exemplary, rotating discharge assembly for use in realizing the illustrative embodiment of FIG. 2.
Figure 3B:
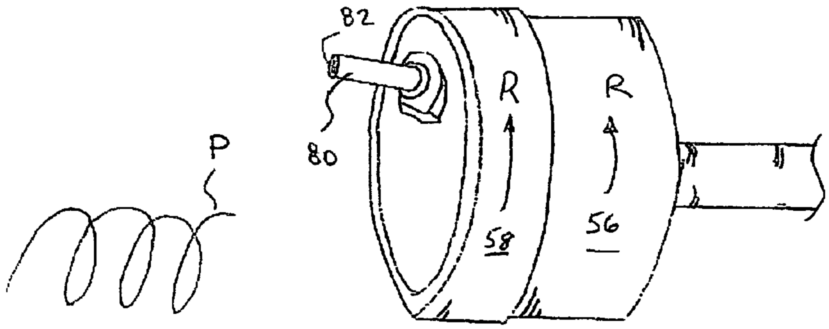
FIG. 3B is a perspective view depicting final assembly of the exemplary rotating nozzle assembly of FIG. 3A.

In accordance with an especially preferred embodiment of the present invention, however, the force for spinning section 32 of discharge assembly 30 is provided via the pressurized material traversing flow conduit 48. An exemplary structure adapted to utilize this force is depicted in FIGS. 2–3B and will now be described in detail. As seen in FIG. 2, first section 32 of discharge assembly 30 comprises a first half 56 and a second half 58 which, when assembled into the configuration shown in FIGS. 3A and 3B, define an interior cavity 50 (FIGS. 2 and 4) within which is disposed a flow diverter assembly indicated generally at 52.

With reference to both FIGS. 2 and 3A, it will be seen that flow diverter assembly 52 has a proximal end 60 dimensioned and arranged to be received and retained within conduit 48 of first conduit assembly. First conduit assembly 46 and flow diverter assembly 52 are fastened together in a conventional manner such, for example, as by a suitable adhesive. Accordingly, fluid diverter assembly 52 is not a moving part but, rather, is stationary despite being disposed within interior cavity 50. Fluid material exiting the discharge orifice 48 of first conduit assembly 46 enters an inlet 68 (FIG. 3A) defined at the proximal end 60 of flow diverter assembly 52. The center of first section 56 defines an axial opening 57 through which proximal end 60 is inserted. To prevent fluid material from leaking out of interior cavity 50, O-rings or other suitable gaskets may be utilized in a conventional manner at the interface between moving parts and bushings may be incorporated as required to prevent axial movement of rotatable first section 32 relative to the fixed section 34 of discharge assembly 30.

In any event, and with particular reference to FIG. 3A, it will be seen that defined within the interior axial surface 59 of second half 58 are a plurality of vanes 70. As best seen in FIG. 2, liquid entering inlet opening 68 of flow diverter assembly 52 exits via a pair of exit openings indicated generally at 72 and 74. As will be readily appreciated by those skilled in the art, exit opening 72 and 74 are dimensioned and arranged so as to cause corresponding jets of liquid to impinge upon the surfaces of vanes 70, thereby initiating rotation of first section 32.

With particular reference to FIG. 3B, it will be seen that spinning of first section 32 in the direction of arrow R and about a rotational axis parallel to axis A—A of container 12 (FIG. 1), enables the contents of container 12 to be deposited along a helical deposit path. As used herein, the phrase helical deposit path is intended to refer to any path having a curvilinear component which is transverse to the direction in which the container, as container 12, is moved. An illustrative deposit pattern is indicated generally at P in FIG. 3B.

In any event, and with continued reference to FIGS. 1–3B, it will seen that discharge assembly 30 further includes a pivotably movable nozzle member 80 having a distal section defining a nozzle orifice 82 and having a substantially spherical proximal section 84 retained in fluid communication with interior cavity 50 of first section 32. Such a structure is advantageous in that it gives the user a high degree of flexibility and creativity. As will be readily appreciated by those skilled in the art, the closer the nozzle tip is to the center of rotation, the smaller the arc covered during each period of rotation. Of course, if such flexibility is not a design constraint, then it is of course possible to integrally form a nozzle member directly as part of second section 32. In that regard, it is contemplated that a nozzle member so constructed may be configured to extend forward at any desired angle relative to the axis of rotation of rotatable discharge assembly 30. It is further contemplated that multiple nozzle members may be included so as to cause to simultaneous streams to be helically wound about the axis of nozzle assembly rotation.

Finally, although the nozzle member 80 depicted in the illustrative embodiment is shown in a position that is offset relative to the axis of rotation of first section 32, it should be emphasized that by placing the nozzle member 80 at the center of rotation would allow a dual mode of dispensing. That is, by aligning the discharge opening 82 so that it is coaxial with the axis or rotation (axis A—A in FIG. 1), it is possible to obtain a rectilinear mode of operation in which linear movement of the system 10 yields a hall rectilinear deposit path notwithstanding rotation of first section 32. Conversely, pivoting nozzle member out of axial alignment with the rotational axis of first section 32 will produce the helical/curvilinear deposit path as previously described.

From the foregoing, it will be understood that when the user inverts the container 12 containing a flowable liquid material and directs the nozzle 80 at a food product and applies a squeezing pressure to container 12, the material will be forced through outlet channel 82 and dispensed as a spiral or straight line stream.

While the particular food product dispensing system and methods as herein shown and described in detail are fully capable of attaining the above-described objects of the invention, it is to be understood that they are merely illustrative embodiments of the present invention and are thus merely representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. An apparatus comprising:

an axially extending container defining a container opening and an interior chamber for receiving and storing a viscous food product;

a discharge assembly coupled to said container and defining an input opening for receiving viscous food product from said interior chamber through said container opening and an outlet opening for discharging the viscous food product, said discharge assembly being dimensioned and arranged to spin or move relative to the container while receiving viscous food product from the interior chamber, said outlet opening being arranged such that said outlet opening moves relative to said container when said discharge assembly spins or moves to discharge received viscous food product as it spins or moves to form a discharge pattern; and a fluid transfer system operative to develop forces for causing the viscous food product disposed within the interior chamber to flow through said container opening and out of the discharge assembly, said discharge assembly being driven to spin or move by energy imparted by the flow of food product from the chamber of the container toward the discharge assembly.

2. The apparatus of claim 1, wherein said container is a squeeze bottle and wherein said fluid transfer system comprises a deformable sidewall of said container.

3. The apparatus of claim 1, wherein said discharge assembly includes a first section defining an interior cavity, said first section further defining the inlet opening dimensioned and arranged to establish fluid communication between the interior cavity and said interior chamber, and the outlet opening dimensioned and arranged to allow food product flowing under pressure to exit said interior cavity as a stream as said first section spins or moves.

4. An apparatus comprising:

an axially extending container defining a container opening and an interior chamber for receiving and storing a viscous food product;

a discharge assembly coupled to said container, said discharge assembly being dimensioned and arranged to spin or move, relative to the container, while receiving viscous food product from the interior chamber and to discharge received viscous food product as it spins or moves to form a discharge pattern, wherein said discharge assembly includes a first section defining an interior cavity, said first section further defining an inlet opening dimensioned and arranged to establish fluid communication between the interior cavity and said interior chamber, and an outlet opening dimensioned and affanged to allow food product flowing under pressure to exit said interior cavity as a stream as said first section spins or moves; and a fluid transfer system operative to develop forces for causing the viscous food product disposed within the interior chamber to flow through said container opening and out of the discharge assembly, wherein said discharge assembly further includes a plurality of vanes disposed within said interior cavity, said vanes being dimensioned and arranged to convert energy imparted by flowing food product impinging thereon into forces driving one of reciprocal and rotary motion of said first section.

5. The apparatus of claim 4, wherein said discharge assembly further includes a pivotably movable nozzle member having a distal section defining a nozzle orifice and having a substantially spherical proximal section retained in fluid communication with said outlet opening, whereby a user can control at least one of a diameter, direction, motion pattern and a pitch of said discharge pattern.

6. The apparatus of claim 4, wherein said discharge assembly further includes a flow director assembly adapted to receive viscous food product from the interior chamber and to change a direction of flow so as to cause arriving food product to impinge upon said vanes.

7. The apparatus of claim 3, wherein said discharge assembly further includes a pivotably movable nozzle member having a distal section defining a nozzle orifice and having a substantially spherical proximal section retained in fluid communication with said outlet opening, whereby a user can select at least one of a desired diameter, direction, motion pattern and of a desired pitch of said discharge pattern.

8. The apparatus of claim 1, wherein said container includes a threaded exterior region proximate said container fill opening, said discharge assembly further including a second section threadably securable to the container and defining an axial conduit for transfer of flowing food product from within said interior chamber to within said interior cavity.

9. The apparatus of claim 1, wherein said discharge assembly is manipulable into a locked configuration relative to the container such that said discharge assembly remains stationary while food product is discharged from within the interior chamber.

10. A discharge assembly for dispensing a flowable food material disposed within an internal chamber of an axially extending container having a threaded exterior region, the discharge assembly comprising:

a first section defining an interior cavity, said first section further defining an inlet opening dimensioned and arranged to establish fluid communication between the interior cavity and the interior chamber of the container, and an outlet opening dimensioned and arranged to allow food material flowing under pressure to exit said interior cavity as a stream; and a second section threadably securable to the threaded exterior region and defining an axial conduit for transfer of flowing food material from within said interior chamber to within said interior cavity;

said first section being dimensioned and arranged to spin or move relative to the second section and container to which said second section is secured while receiving flowing food material from the interior chamber, said outlet opening being arranged such that said outlet opening moves relative to said second section when said discharge assembly spins or moves to discharge received food material as it spins or moves to form a discharge pattern, said first section being driven to spin or move by energy imparted by the flow of food product from the chamber of thr container toward the discharge assembly.

11. The discharge assembly of claim 10, wherein said discharge assembly further includes a plurality of vanes disposed within said interior cavity, said vanes being dimensioned and arranged to convert energy imparted by flowing food material impinging thereon into forces driving one of reciprocal and rotary motion of said first section relative to said second section and the container.

12. The discharge assembly of claim 11, wherein said discharge assembly further includes a pivotably movable nozzle member having a distal section defining a nozzle orifice and having a substantially spherical proximal section retained in fluid communication with said outlet opening, whereby a user can control at least one of a diameter, direction, motion pattern and a pitch of said discharge pattern.

13. A method of dispensing a flowable food product from a container, comprising the steps of:

initiating a flow of food product from a chamber of a container containing a flowable edible material toward a discharge assembly having an exit orifice;

rotating or moving the discharge assembly, relative to the container, while the edible material is being discharged via the exit orifice so that the exit orifice moves relative to the container while the discharge assembly is rotating or spinning to thereby discharge a motion pattern deposit on said edible material target surface, the discharge assembly being driven to rotate or move by energy imparted by the flow of food product from the chamber of the container toward the discharge assembly.

14. The method of claim 13, wherein said rotating step comprises causing the viscous edible material under pressure to impinge upon vanes of the nozzle assembly.

15. The method of claim 13, wherein the container is a squeeze bottle, said method further including a step of squeezing the container to thereby cause the edible material to flow from the chamber into the discharge assembly.

16. The method of claim 13, wherein said flowable food product is a condiment.

* * * * *